United States Patent [19]

Kalopissis et al.

[11] 3,712,158
[45] Jan. 23, 1973

[54] DYEING HUMAN HAIR AND COMPOSITION FOR INCLUDING AN OXIDATION DYE AND HETEROCYCLIC COUPLER THEREOF

[75] Inventors: Gregoire Kalopissis; Jean Gascon, both of Paris; Jacqueline Gallien, La Garenne Colombe; Andree Bugaut, Boulogne sur Seine; Hubert Gaston-Breton, Paris, all of France

[73] Assignee: L'Oreal Societe Anonyme dite, Paris, France

[22] Filed: March 20, 1972

[21] Appl. No.: 236,498

Related U.S. Application Data

[62] Division of Ser. No. 783,414, Dec. 12, 1968, Pat. No. 3,674,414.

[30] Foreign Application Priority Data

Dec. 15, 1967    Luxembourg ............................55,116
Aug. 23, 1968    Luxembourg ............................55,759

[52] U.S. Cl..............................................8/11, 8/10.2
[51] Int. Cl. ..................................................D06p 1/32
[58] Field of Search .....................8/11; 260/552, 553

[56] References Cited

UNITED STATES PATENTS 3,119,867    1/1967    Lecher et al............................8/11 X
3,420,883    1/1969    Bartoszewicz..........................8/11 X

OTHER PUBLICATIONS

U.S. Abstract 88, 685, Vol. 652, O.G. Nov. 6, 1951 p. 289–290, Weissberger.

*Primary Examiner*—George F. Lesmes
*Assistant Examiner*—Patricia C. Ives
*Attorney*—Donald B. Deaver and Holcombe, Wetherill & Brisebois

[57]    ABSTRACT

A group of coupling agents, of which the following are representative: 3-dimethylamino-phenylurea, 3-dimethylamino-phenylthiourea, (3-hydroxy-6-methoxy)-phenylurea, (3-hydroxy-6-methoxy)-phenythiourea, (2,4-dimethyl-3-hydroxy)-phenylurea, (2,4-dimethyl-3-hydroxy)-phenylthiourea, and (4-methyl-3-hydroxy)-phenylthiourea. The invention also includes these couplers in association with oxidation dyes, and a method of dyeing hair using said compositions.

4 Claims, No Drawings

DYEING HUMAN HAIR AND COMPOSITION FOR INCLUDING AN OXIDATION DYE AND HETEROCYCLIC COUPLER THEREOF

This is a division of application Ser. No. 783,414, filed Dec. 12, 1968, now U.S. Pat. No. 3,674,414.

SUMMARY OF THE INVENTION

Among the known compositions used to dye keratinic fibers, and particularly human hair, are those compositions containing oxidation dyes, and particularly the derivatives having diamino or hydroxyl-amino groups attached in ortho or para position to benzene, napthalene, or heterocyclic rings. The stability to light and inclement weather of the dyes obtained from certain of these bases may be improved in a known manner by using coupling agents, —specifically, paradiamines, phenolic derivatives, diketones, and pyrazolones have already been used for this purpose.

It is the object of the present invention to provide a new class of couplers which may be used with conventional oxidation dyes.

The present invention accordingly provides as a new article of manufacture a composition for dyeing keratinic fibers, and, in particular human hair, essentially characterized by the fact that it contains:

1. At least one base consisting of an oxidation dye selected from among those compounds which have two amino groups, or an amino group and a hydroxy group, attached in ortho or para position to either aromatic rings, and in particular to benzene or napthalene rings, or to heterocyclic rings, and in particular to pyridine rings;

2. And at least one coupler having the formula:

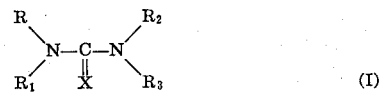

(I)

in which X represents oxygen, sulfur, or an NH group; R and $R_3$ are identical or different and represent hydrogen, a lower alkyl group, a $CH_2CONH_2$ radical, or a $CH_2CON(C_2H_5)_2$ radical; $R_2$ represents hydrogen, a lower alkyl radical, an aryl radical which may be substituted, and in particular a benzene or naphthalene radical, or any of the radicals included in the following group listed under $R_1$, $R_1$ is selected from the group consisting of:

a. either a benzene radical responding to the formula:

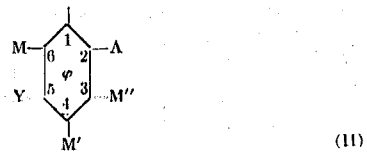

(II)

in which A may represent a hydroxy group, in which case Y represents a lower alkoxy radical, or A may represent a hydrogen atom or an alkoxy radical, in which case Y represents a hydroxy radical or an $NR_5R_6$ radical in which $R_5$ and $R_6$ represent a hydrogen atom, a lower alkyl radical, or an aryl radical, but both $R_5$ and $R_6$ cannot be aryl radicals; M, M' and M'' are identical or different and represent hydrogen, a hydroxy group, an amino group, a lower alkyl group, a lower alkoxy group, a halogen atom, or an aryl group, and in particular a benzene or naphthalene group;

b. or a heterocyclic radical derived from a benzene cycle by replacing at least one of the CH groups with a nitrogen atom, this radical being attached to the nitrogen atom which carries the $R_1$ radical in formula I at position 1, and the nitrogen atom or atoms in the heterocyclic ring being attached at positions 2, 4 or 5;

c. or a naphthol or naphthyl-amine radical, which may or may not be substituted;

d. or a radical having the formula:

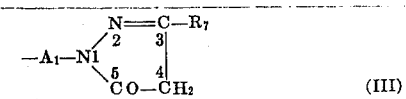

(III)

in which $A_1$ represents an aryl group, and in particular a benzene ring, and $R_7$ represents an aryl or lower alkyl radical;

e. or a radical having the formula:

(IV)

in which $A_2$ represents an aryl radical, or a lower alkyl radical;

f. or an aceto-acetanilide radical having the formula:

$CH_3-CO-CH_2-CO-NH-C_6H_4-$ or a benzoyl-acetanilide radical having the formula:

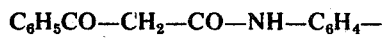

$C_6H_5CO-CH_2-CO-NH-C_6H_4-$

One of the essential characteristics of the invention resides in the fact that, in the hair-dyeing composition according to the invention the concentration of the base functions is less than or equal to the concentration of the coupler functions, the relative amounts of base functions and coupling functions being 1:4 to 1:1.

The dyeing composition according to the invention is put into use in a conventional manner by using a pH between 7 and 11, which pH is obtained, for example, by adding ammonia, and applying the composition to the hair in the presence of an oxidizing solution which is preferably a hydrogen peroxide solution.

The dyeing composition according to the invention may also contain other dyes suitable for use under the same conditions, such as direct dyes (for example, azo, anthraquinone, or metalliferous dyes) or dyes obtained by associating bases and couplers other than those to which the present invention is directed.

The dyeing composition according to the present invention may also contain wetting agents, dispersing agents, penetrating agents, and any other ingredients conventionally used to dye hair. It may take the form of an aqueous solution, a cream, or a gel.

It should be noted that the replacement of an amine coupler by its urein or thiourein, in association with any given base, results in a change in the shade of the dye obtained in the red, violet, blue, green direction.

This coupler makes it possible to obtain colors from phenolic derivatives, the shades of which approach those which can be obtained with meta-diamines. However, it is well known that the meta-diamines themselves produce colors which are generally mediocre with respect to fastness.

One of the fundamental advantages of the dyeing composition according to the invention is that it preserves the conventional properties of the oxidation dyes used as its base, and in particular, a perfect fastness when washed with water and conventional detergents, while adding an exceptional fastness under exposure to light and weather. It should be noted that, while degradation occurs after prolonged exposure to light and wet weather, this degradation is very moderate, and consists only of a lightening of the color, without any change in its shade. It is well known that, in the case of hair dyes, this advantage is essential, because a lightening of the shade is acceptable, whereas a change in the color is not.

It is a further object of the present invention to provide a new method of dyeing human hair essentially characterized by the fact that after having added hydrogen peroxide thereto, the above dyeing composition is applied to the hair, which is then rinsed, shampooed, and dried.

Another object of the present invention is to provide as a new article of manufacture the compounds having the formula:

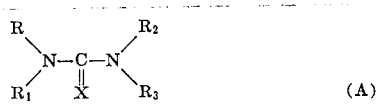
(A)

in which X represents hydrogen or sulfur, R and $R_3$ may be identical or different, and represent hydrogen, a lower alkyl group, a —$CH_2CONH_2$ radical, or a —$CH_2CON(C_{25})_2$ radical; $R_2$ represents hydrogen, a lower alkyl radical, an aryl radical which may be substituted, and in particular, a benzene or naphthalene radical or the radical $R_1$; and $R_1$ represents a 3-dimethylamino-phenyl radical, 2,4-dimethyl-3-hydroxyphenyl, or 3-hydroxy-6-methoxy-phenyl, or 4-methyl-3-hydroxy phenyl.

Among the compounds having general formula A are: 3-dimethylamino- phenylurea, (3-hydroxy-6-methoxy) phenylurea, (2,4 dimethyl-3-hydroxy)phenylurea, 3-dimethylaminophenylthiourea, (3-hydroxy-6-methoxy)phenylthiourea, (2,4-dimethyl-3-hydroxy)phenylthiourea, (4-methyl-3-hydroxy)phenylthiourea.

A further object of the present invention is to provide a new process for preparing compounds having formula A characterized by the fact that an amine salt having the formula:

is reacted with an alkaline isocyanate or an alkaline isothiocyanate, depending on whether the object is to obtain a compound (A) in which X represents oxygen, or a compound (A) in which X represents sulfur.

Several examples illustrating the preparation and application of the product according to the invention will now be described purely by way of illustration.

EXAMPLE 1

Preparation of 3-dimethylamino-phenylurea 27.2 g (0.2 mols) of 3-dimethylamino aniline is dissolved in 200 cc of a normal solution of hydrochloric acid. In 30 minutes about 16.2 g (0.2 mol) of potassium isocyanate dissolved in about 250 cc of water is added. The mixture is then brought to its boiling point and left to cool overnight. White crystals are separated by filtration and redissolved in 800 cc of boiling water. After filtering and cooling, the result is a crystalline product having a melting point of 123°C.

EXAMPLE 2

Preparation of (3-hydroxy-6-methoxy) phenylurea 50 g (0.36 mol) of 3-amino-4-methoxy phenol is dissolved in 225 cc of a 1.6N solution of hydrochloric acid. This solution is cooled to 0°C and 0.432 mol of potassium isocyanate is added. After 10 minutes, this is dried, yielding 63.4 g of (3-hydroxy-6-methoxy) phenylurea which, after recrystallization in methanol, melts at 193.5°C.

EXAMPLE 3

Preparation of (3-hydroxy-6-methoxy) phenylthiourea 6.95 g (0.05 mols) of 3-amino-4-methoxy-phenol is dissolved in 10cc of a 5N hydrochloric acid solution. 5 g (0.05 mol) of potassium isothiocyanate dissolved in 5cc of water is added to this solution, little by little.

After heating it for an hour, the reaction mixture is left for several hours at the ambient temperature, and cooled. Drying then yields 6g of (3-hydroxy-6-methoxy) phenylthiourea which, after recrystallization in methanol, melts at 188.5°C.

EXAMPLE 4

Preparation of (2,4-dimethyl-3-hydroxy)phenylurea 41.6 g (0.24 mol) of 3-amino-2,6-dimethyl phenol hydrochloride, is dissolved in 420 cc of water at 50°C. 26g (0.32 mol) of potassium isocyanate is added to this solution. The reaction mixture is kept at this temperature for several minutes, and cooled, whereupon drying yields 40g of (3,4-dimethyl-3-hydroxy)phenylurea which, after recrystallization in a 1:1 mixture of ethanol and water, melts at 212°C.

EXAMPLE 5

Preparation of (2,4-dimethyl-3-hydroxy) phenylthiourea 6.85g (0.05 mols) of 3-amino-2,6-dimethyl phenol is dissolved in a 5N solution of hydrochloric acid. This solution is brought to its boiling point and 5g (0.05 mol) of potassium isocyanate dissolved in 5cc of water is added little by little. After heating for an hour, the reaction mixture is left standing for several hours, and then cooled, whereupon drying yields 7g of (2,4-dimethyl-3-hydroxy)phenylthioruea which, after recrystallization in water, melts at 203°C.

EXAMPLE 6

Preparation of 4-methyl-3-hydroxy-phenyl thiourea

The following constitutes are mixed cold in the order given:

| | |
|---|---|
| 2-methyl-5-amino-phenol | 31 g |
| water | 50 cc |
| hydrochloric acid 19 Be | 20 cc |
| potassium thiocyanate | 31 g |

The temperature of the mixture is gradually increased so as to bring it to its boiling point in about an hour. This temperature is then maintained for 2 hours.

The mixture is then permitted to cool, while stirring.

The precipitate formed by cooling is filtered and dried. Its melting point is 202°C.

The crude product is recrystallized in 450 cc of boiling water, in which it is almost completely soluble, by cooling the filtered solution. A crystalline precipitate is obtained which has a melting point of 202°C. A second recrystallization does not change this melting point.

EXAMPLE 7

A solution of the coupler is prepared by dissolving 1.79 g of 3-dimethylamino phenylurea in a mixture A having the following composition.

| | |
|---|---|
| sodium sulfate alkyl ether condensed with 2 moles of ethylene oxide | 20 g |
| ammonia solution (density = 0.9) | 10 g |
| sodium bisulfite solution (density = 1.32) | 1 g |
| ethylene diamine tetra acetic acid | 0.2 g |
| water, q.s.p. | 100 g |

This solution has a pH of about 10.5.

A solution of the base is prepared by dissolving 1.24 g of 2,5-diamino toluene in 100 g of mixture A.

Part of the coupling solution is first mixed with an equal part of the base solution. Then, at the moment of use, an equal quantity of 6% $H_2O_2$ solution is added to a part of this composition and the mixture is applied to natural gray hair. After 20 to 30 minutes of contact at room temperature, the hair is rinsed, shampooed, rinsed again, and dried.

A medium green results.

EXAMPLE 8

A composition is prepared in accordance with the method of Example 7, except that 1.60 g of 2,5-diamino-chlorobenzene is used as the base.

A medium greenish blue is obtained.

EXAMPLE 9

A solution of the coupler is prepared by dissolving 1.79 g of 3-dimethylamino phenylurea, in a mixture having the following composition:

| | |
|---|---|
| sodium sulfate alkyl ether condensed with 2 mols of ethylene oxide | 20 g |
| ammonia, g.s.p. | pH 7.5 |
| sodium bisulfite solution (density = 1.32) | 1 g |
| ethylene-diamine-tetra-acetic acid | 0.2 g |
| water, q.s.p. | 100 g |

A solution of the base is prepared by dissolving 2.4 g of 2,5-diamino anisol sulfate in 100g of this mixture. The procedure is the same as in Example 7.

The result is a medium green.

EXAMPLE 10

The following solution is prepared:

| | |
|---|---|
| (3-hydroxy-6-methoxy)phenylurea | 0.455 g |
| para-tolylenediamine | 0.3 g |
| lauryl ammonium sulfate with 20% fatty alcohol | 20 g |
| ethylene diamine tetra acetic acid | 0.3 g |
| 20% ammonia | 10 g |
| sodium bisulfite | 1 g |
| water, q.s.p. | 100 g |

This solution mixed with an equal quantity by weight of 6 percent hydrogen peroxide, when applied for 30 minutes to 100 percent white hair, produces a slightly violet blue gray color.

EXAMPLE 11

The following solution is prepared:

| | |
|---|---|
| (3-hydroxy-6-methoxy) phenylthiourea | 0.495 g |
| para-tolylenediamine | 0.3 g |
| lauryl ammonium sulfate with 20% fatty alcohol | 20 g |
| ethylene diamine tetra acetic acid | 0.3 g |
| 20% ammonia | 10 g |
| sodium bisulfite | 1 g |
| water, q.s.p. | 100 g |

This solution mixed with an equal quantity by weight of 6 percent hydrogen peroxide, when applied for 30 minutes to 100 percent white hair, colors it blue gray.

EXAMPLE 12

The following solution is prepared:

| | |
|---|---|
| 2,4-dimethyl-3-hydroxy phenylurea | 0.49 g |
| para tolylenediamine | 0.3 g |
| lauryl ammonium sulfate with 20% fatty alcohol | 20 g |
| ethylene diamine tetra acetic acid | 0.3 g |
| 20% ammonia | 10 g |
| sodium bisulfite | 1 g |
| water, q.s.p. | 100 g |

This solution, mixed with an equal quantity, by weight, of 6 percent hydrogen peroxide, when applied for 30 minutes to 100 percent white hair, colors it a violet blue.

EXAMPLE 13

The following solution is prepared:

| | |
|---|---|
| paratolylene diamine | 1 g |
| chloroparaphenylene diamine | 0.4 g |
| resorcinol | 0.1 g |
| (2,4-dimethyl-3-hydroxy phenyl)urea | 1.9 g |
| lauryl ammonium sulfate with 20% fatty alcohol | 20 g |
| ethylene diamine tetra acetic acid | 0.3 g |
| 20% ammonia | 10 g |
| 40% sodium bisulfite | 1 g |
| water, q.s.p. | 100 g |

This solution mixed with an equal quantity, by weight of 6 percent hydrogen peroxide when applied for 30 minutes to 100 percent white hair, colors it a violet mahogany.

EXAMPLE 14

The following solution is prepared:

| | |
|---|---|
| paratolylene diamine | 1 g |
| 2,5-diamino-4-methyl methoxy-benzene | |

| | |
|---|---|
| dihydrochloride | 0.2 g |
| resorcinol | 0.1 g |
| (3-amino-phenyl) urea hydrochloride | 3 g |
| lauryl ammonium sulfate with 20% fatty alcohol | 20 g |
| ethylene diamine tetra acetic acid | 0.3 g |
| 20% ammonia | 10 g |
| 40% sodium bisulfite | 1 g |
| water, q.s.p. | 100 g |

This solution, when mixed with an equal quantity, by weight, of 6 percent hydrogen peroxide, and applied for 30 minutes to 100 percent white hair, colors it a greenish brown.

EXAMPLE 15

A solution of the coupler is prepared by dissolving 1.52g of N-(3-hydroxy phenyl)-urea in a mixture A having the following composition:

| | |
|---|---|
| sodium sulfate alkyl ether condensed with 2 mols of ethylene oxide | 20 g |
| ammonia solution (density=0.9) | 10 g |
| sodium bisulfite solution (density=1.32) | 1 g |
| ethylene-diamine-tetra-acetic acid | 0.2 g |
| water, q.s.p. | 100 g |

This solution has a pH of about 10.5.

A solution of the base is prepared by dissolving 1.08 g of 1,4-diamino-benzene in 100 g of mixture A. It has a pH of about 10.5.

Firstly, a part of the coupler solution is mixed with an equal part of the base solution. Then, at the moment of use, part of this composition is added to an equal quantity of a 6 percent solution of hydrogen peroxide, and this mixture is applied to naturally gray hair. After 20 to 30 minutes of contact at the ambient temperature, the hair is rinsed with water, shampooed, rinsed again and dried.

The result is a deep violet which is particularly fast to light and inclement weather, which do not cause any substantial change in the shade thereof.

EXAMPLE 16

A composition is prepared in accordance with the method of example 7, but using:

| | |
|---|---|
| Coupler: N-(4-methyl-3-hydroxy-phenyl)-urea | 1.66 g |
| Base: 2,5-diamino anisol sulfate | 2.36 g |

This produces a deep blue which is fast to light and exposure to inclement weather.

EXAMPLE 17

A composition is prepared in accordance with the method of example 7, but using:

| | |
|---|---|
| Coupler: N-(3-hydroxy-phenyl)-thiourea | 1.68 g |
| Base: 4-amino-(N-ethyl-N-carbamyl-methyl)-aniline | 1.97 g |

The result is a medium blue, which is especially fast to light and inclement weather, which cause no substantial change in its shade.

EXAMPLE 18

A composition is prepared in accordance with the method of Example 7, but using:

| | |
|---|---|
| Coupler: N-(4-methyl-3-hydroxy-phenyl)-urea | 1.66 g |
| Base: 4-amino-phenol | 1.09 g |

The result is a light mahogany shade, which has a fastness to light and inclement weather which is clearly superior to that resulting from the use of a coupler which is not substituted on the nitrogen. The shade remains unaltered.

EXAMPLE 19

A composition is prepared in accordance with the process of example 7, but using:

| | |
|---|---|
| Coupler: N-(4-methyl-3-amino-phenyl)-thiourea | 2.00 g |
| Base: 2,5-diamino-toluene | 1.22 g |

This produces a deep green color, which represents a valuable change in shade from the one resulting from the use of the corresponding coupler in which the amino groups are not substituted.

EXAMPLE 20

A composition is prepared in accordance with the method of example 7, but using:

| | |
|---|---|
| Coupler: N-(3-hydroxy-phenyl)-urea | 1.52 g |
| Base: 1-Chloro-2,5-diamino-benzene | 1.435 g |

This produces a medium reddish purple, which represents a valuable change in shade from the chestnut produced when meta-amino-phenol is used as the coupler, with the same base.

EXAMPLE 21

A solution A1 having the following composition is prepared:

| | |
|---|---|
| Coupler: Bis-N,N'-(3-hydroxy-phenyl)-urea | 2.32 g |
| Ammonia solution (density=0.9) | 10 cm³ |
| Water, q.s.p. | 100 cm³ |

A solution A2 having the following composition is prepared:

| | |
|---|---|
| Base: 3-methyl-4-amino-[N-ethyl-N-β(methylsulfamido)-ethyl]aniline sulfate | 2.88 g |
| Ammonia solution (density 0.9) | 10 cm³ |
| Water, q.s.p. | 100 cm³ |

First, part of the solution A1 is mixed with an equal part of the solution A2.

The oxidizing agent is then added and the mixture used as described in Example 7.

The result is a light green color.

EXAMPLE 22

A composition is prepared in accordance with the method described in example 21, but using:

| | |
|---|---|
| Coupler: N-(3-hydroxy-phenyl)-urea | 2.00 g |
| Base: 3-methyl-4-amino-(N-ethyl-N-carbamylmethyl)-aniline | 2.00 g |

The result is a medium blue, which represents a useful change from the chestnut color produced when a meta-aminophenol is used with the same base. The color has also a greater fastness under exposure to light.

EXAMPLE 23

A composition is prepared in accordance with the method of Example 21, using 2.32 g of the same coupler as in Example 21, and 2.00 g of the same base as in Example 22.

The result is a deep blue which is perfectly fast under exposure to light.

EXAMPLE 24

Solutions of couplers are prepared as set forth in Examples 21 and 22. These two solutions are mixed in any desired proportions. To one part of this mixture there is added an equal quantity of the base solution described in example 22, and twice that quantity of 6 percent hydrogen peroxide solution. Depending on the proportional relationship between the two couplers, any shade of blue from medium to the deepest blue may be obtained. The colors are very fast.

EXAMPLE 25

A composition is prepared in accordance with the method of Example 21, but using:

Coupler: N-(3-hydroxy-phenyl)-N'-(4'-methyl-3'-hydroxy phenyl)-urea  2.56 g
Base: 2,5-diamino toluene  1.22 g This produces a medium purple.

EXAMPLE 26

A composition is prepared in accordance with the method of example 21, but using:

Coupler: Bis-N,N'-(3 hydroxy-phenyl)-thiourea  2.6 g
Base: 3-methyl-4-amino-(N-ethyl-N-carbamyl)-methylaniline  2.0 g This produces a deep blue which is very fast when exposed to light.

EXAMPLE 27

A composition is prepared in accordance with the method of Example 7, but using the intermediates of Example 26.

The resulting color is the same as in Example 26 and of comparable fastness.

EXAMPLE 28

A composition is prepared in accordance with the method of Example 21, but using as the coupler a solution containing 2.7g of Bis-N,N-(4-methyl-3-hydroxy-phenyl)-urea and the same base as in Example 26.

This produces a deep purplish blue, which is very fast when exposed to light.

EXAMPLE 29

A composition is prepared in accordance with the method of Example 7, but using:

Coupler: Bis-N,N'-carbamyl-methyl-N,N'-(4-methyl 3-hydroxy-phenyl)-urea  4 g
Base: 2,5-diamino-toluene  2.44g This produces a greenish blue.

EXAMPLE 30

A composition is prepared in accordance with the method of Example 7, but using:

Coupler: N-(2-hydroxy-5-methoxy-phenyl)-urea  1.85g
Base: 1,4-diamino-benzene  1 g This produces a deep blue.

EXAMPLE 31

A composition is prepared in accordance with the method of Example 21, but using:

Coupler: N-(3-hydroxy-phenyl)-N'-(4'-hydroxy-phenyl) urea  2.32 g
Base: 4-amino-N-ethyl-N-(carbamyl methyl) aniline  1.9 g This produces a blue-gray.

EXAMPLE 32

A solution of coupler is prepared by dissolving 1.82 g of 4-methyl-3-hydroxy phenyl thiourea in 100 g of the mixture A described in Example 7.

A solution of the base is prepared by dissolving 2.4g of 2,5-diamino anisol sulfate in 100g of the same mixture.

Using the same procedure as in Example 7, a deep blue color is produced.

This color is very fast when exposed to light and inclement weather, which have no effect on its shade.

It will of course be appreciated that the foregoing examples have been given purely by way of illustration and may be modified as to detail without thereby departing from the basic principles of the invention.

To further illustrate the invention, oxidation dyes that may be used with the coupling agents of this invention are:

a. Benzene rings with 2 amino groups
paraphenylene-diamine
paratolylene-diamine
paraamino-N,N-dimethyl-aniline
4,4'-diamino-diphenyl-amine
4-amino-diphenyl-amine
paradiamino-anisole
4-amino-3-methyl- N-ethyl-N-carbamyl-methylaniline
4-amino-N-ethyl-N-carbamylmethyl-aniline
4-amino-3-methyl-N-ethyl-N(N'N'-diethyl)-carbamyl-methyl-aniline
4-amino-N-ethyl-N-(N'N'-diethyl)carbamylmethyl-aniline
N-(4-amino-phenyl) morpholine
N-(4-amino-phenyl) piperidine
N-methyl-N-(4'-amino-phenyl) B-amino-acetic acid
4-amino-3-methyl-N-ethyl-N-(B-methyl-sulfamidoethyl) aniline sulfate
1-3-dimethyl, 2-5-diamino-benzene
1-2-dimethyl, 3-6-diamino-benzene
4-chloro-2-5-diamino-toluene
2-4-dimethyl, 3-6-diamino-anisole b. Benzene rings with 1 amino and 1 OH group
paramino-phenol
4-amino-4-oxydiphenylamine c. Pyridine rings 2,3-diamino-pyridine
2,5-diamino-pyridine
2-diethylamino-5-amino-pyridine
5,5'-diamino-bis(-2 pyridyl)-amine
6-dydroxy-4-methyl-2,3-diamino-pyridine
6-methoxy-2,3-diamino-pyridine
6-methoxy-2,3-diamino-pyridine
2-dimethylamino-5-diamino-pyridine
2-dimethylamino-5-amino-pyridine
2-methylamino-5-amino-pyridine
2-ethyl-amino-5-amino-pyridine
2-amino-5-dimethylamino-pyridine
2-amino-5-methylamino-pyridine
2-methylamino-5-methylamino-pyridine The coupling agents of compound I include the following illustrative compounds:

$R_1$ = phenyl radical
N-(3-amino-phenyl)urea hydrochloride
N-(3-amino-phenyl) thiourea hydrochloride
N-(3-hydroxy-phenyl) thiourea
N-(4-methyl-3-aminophenyl) thiourea
Bis-N,N'(3-hydroxyphenyl) urea
Bis-N,N'(3-hydroxyphenyl) thiourea
N-(3-hydroxyphenyl)N-(4'-methyl-3-hydroxyphenyl)urea
Bis-N,N'(4-methyl-3-hydroxyphenyl)urea
Bis-N,N'(carbamyl methyl)-N,N'-(4'-methyl-3-hydroxyphenyl)urea
N-(2-hydroxy-5-methoxyphenyl)urea
N-(3-hydroxyphenyl)-N'-(4'-hydroxyphenyl)urea
Bis-N,N'-(3-amino-phenyl)thiourea $R_1$ = naphthol or naphthylamine radical
7-ureido-2-naphtol
1-ureido-4-sulfo-8-naphtol $R_1$ = radical of the formula:

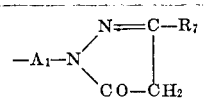
(III)

1-(3'-ureido)phenyl-3-methyl-pyrazol-5-one $R_1$ = radical of the formula:

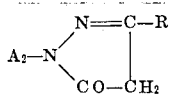
(IV)

1-phenyl-3(3'-methyl)-thioureido-pyrazol-5-one.

$R_1$ = acetanilide radical
4-benzoyl acetylamino phenylurea
4-aceto acetylamino phenylurea

What is claimed is:

1. A composition for dyeing hair comprising a mixture of
a. a base compound selected from the group consisting of paraphenylene diamine, paratolylene diamine, paraamino-N,N-dimethyl aniline, 4,4'-diaminodiphenylamine, 4-amino diphenylamine, paradiaminoanisole, 4-amino 3-methyl N-ethyl N-carbamylmethylaniline, 4-amino N-ethyl N-carbamylmethylaniline, 4-amino 3-methyl N-ethyl N-(N',N'-diethyl)-carbamylmethylaniline, 4-amino N-ethyl N-(N',N'-diethyl)-carbamylmethylaniline, N-(4-aminophenyl)morpholine, N-(4-aminophenyl)piperidine, N-methyl N-(4'-aminophenyl) β-aminoacetic acid, 4-amino 3-methyl N-ethyl N-(β-methylsulfamidoethyl) aniline sulfate, 1,3-dimethyl 2,5-diamino benzene, 1,2-dimethyl 3,6-diamino benzene, 4-chloro 2,5-diamino toluene, 2,4-dimethyl 3,6-diamino anisole, paraamino phenol, 4-amino 4'-oxydiphenylamine, 2,3-diamino pyridine, 2,5-diamino pyridine, 2-diethylamino 5-amino pyridine, 5,5'-diamino-bis-(2-pyridyl) amine, 6-hydroxy 4-methyl 2,3-diamino pyridine, 6-methoxy 2,3-diamino pyridine, 2-dimethylamino 5-amino pyridine, 2-methylamino 5-amino pyridine, 2-ethylamino 5-amino pyridine, 2-amino 5-dimethylamino pyridine, 2-amino 5-methylamino pyridine and 2-methylamino 5-methylamino pyridine, and b. at least one coupler having the formula

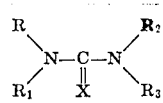

wherein X is selected from the group consisting of oxygen, sulfur and NH; R and $R_3$ each independently are selected from the group consisting of hydrogen, lower alkyl, $CH_2CONH_2$ and $CH_2CON(C_2H_5)_2$, $R_2$ is selected from the group consisting of hydrogen, lower alkyl, phenyl, naphthyl and $R_1$, and $R_1$ is selected from the group consisting of
1. a heterocyclic radical derived from a benzene ring by replacing at least one of the CH groups with a nitrogen atom, this heterocyclic radical being attached to the nitrogen atom which carries $R_1$ at position 1, and the nitrogen atom or atoms in the heterocyclic ring being attached at positions 2,4 or 5,
2. a radical having the formula

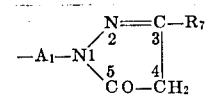

wherein $A_1$ is phenylene and $R_7$ is selected from the group consisting of phenyl and lower alkyl, and
3. a radical having the formula

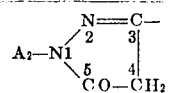

wherein $A_2$ is selected from the group consisting of phenyl and lower alkyl, the weight ratio of said base compound to said coupler ranging between 1:4 and 1:1.

2. The composition of claim 1 wherein said coupler is selected from the group consisting of 1-(3'-ureido)phenyl-3-methyl-pyrazol-5-one and 1-phenyl-3(3'-methyl)-thioureido-pyrazol-5-one.

3. The composition of claim 1 having a pH between 7–11.

4. A method of dyeing human hair comprising impregnating said hair in amounts effective to dye said hair with an aqueous solution of a mixture of (a) a base compound selected from the group consisting of paraphenylene diamine, paratolylene diamine, paraamino-N,N-dimethyl aniline, 4,4'-diaminodiphenylamine, 4-amino diphenylamine, paradiaminoanisole, 4-amino 3-methyl N-ethyl N-carbamylmethylaniline, 4-amino N-ethyl N-carbamylmethylaniline, 4-amino 3-methyl N-ethyl N-(N',N'-diethyl)-carbamylmethylaniline, 4-amino N-ethyl N-(N',N'-diethyl)-carbamylmethylaniline, N-(4-aminophenyl)morpholine, N-(4-aminophenyl)piperidine, N-methyl N-(4'-aminophenyl) β-aminoacetic acid, 4-amino 3-methyl N-ethyl N-(β-methylsulfamidoethyl) aniline sulfate, 1,3-dimethyl 2,5-diamino benzene, 1,2-dimethyl 3,6-diamino benzene, 4-chloro 2,5-diamino toluene, 2,4-dimethyl 3,6-diamino anisole, paraaminophenol, 4-amino 4'-oxydiphenylamine, 2,3-diamino pyridine, 2,5-diamino pyridine, 2-diethylamino 5-amino pyridine, 5,5'-diamino-bis-(2-pyridyl)amine, 6-hydroxy 4-methyl 2,3-diamino pyridine, 6-methoxy 2,3-diamino pyridine, 2-dimethylamino 5-amino pyridine, 2-methylamino 5-amino pyridine, 2-ethylamino 5-amino pyridine, 2-amino 5-dimethylamino pyridine, 2-amino 5-methylamino pyridine and 2-methylamino 5-methylamino pyridine, and (b) at least one coupler selected from the group consisting of a compound having the formula

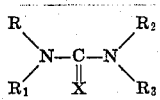

wherein X is selected from the group consisting of oxygen, sulfur and NH, R and $R_3$ each independently are selected from the group consisting of hydrogen, lower alkyl, $CH_2CONH_2$ and $CH_2CON(C_2H_5)_2$, $R_2$ is selected from the group consisting of hydrogen, lower alkyl, phenyl, naphthyl and $R_1$ and $R_1$ is selected from the group consisting of (1) a heterocyclic radical derived from a benzene ring by replacing at least one of the CH groups with a nitrogen atom, this heterocyclic radical being attached to the nitrogen atom which carries $R_1$ at position 1, and the nitrogen atom or atoms in the heterocyclic ring being attached at positions 2, 4 or 5, 2. a radical having the formula

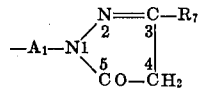

wherein $A_1$ is phenylene and $R_7$ is selected from the group consisting of phenyl and lower alkyl, and 3. a radical having the formula

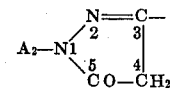

wherein $A_2$ is selected from the group consisting of phenyl and lower alkyl, the weight ratio of said base compound to said coupler ranging between 1:4 to 1:1, in the presence of hydrogen peroxide, said aqueous solution having a pH ranging between 7–11, rinsing, shampooing and drying said hair.

* * * * *